US006603132B1

United States Patent
Van Der Blij et al.

(10) Patent No.: US 6,603,132 B1
(45) Date of Patent: Aug. 5, 2003

(54) DEVICE FOR CURING A UV-CURABLE RESIN LAYER APPLIED TO A MAIN SURFACE OR BETWEEN TWO DISC ELEMENTS OF A DISC-SHAPED REGISTRATION CARRIER

(75) Inventors: Fredrik W. Van Der Blij, Eindhoven (NL); Antonius H. M. Boonen, Geldrop (NL); Paulus H. Eijmberts, Eindhoven (NL)

(73) Assignee: OTB Group B.V., Eindhoven (NL)

( * ) Notice: Subject to any disclaimer, the term of this patent is extended or adjusted under 35 U.S.C. 154(b) by 0 days.

(21) Appl. No.: 09/564,585

(22) Filed: May 5, 2000

(30) Foreign Application Priority Data

May 7, 1999 (NL) .............................................. 1011991

(51) Int. Cl.$^7$ ............................................... B23B 31/00
(52) U.S. Cl. ............................. 250/504 R; 250/504 R; 156/275.5; 156/272.2; 428/694 R; 427/240
(58) Field of Search ................... 250/504 R; 156/275.5, 156/272.2; 428/694 R; 427/240

(56) References Cited

U.S. PATENT DOCUMENTS

| | | | | |
|---|---|---|---|---|
| 5,904,795 A | * | 5/1999 | Murakami et al. ........ | 156/272.2 |
| 6,077,349 A | * | 6/2000 | Kikuchi ..................... | 118/319 |
| 6,214,412 B1 | * | 4/2001 | Paulus et al. .............. | 118/52 |
| 6,254,809 B1 | * | 7/2001 | Parent et al. .............. | 264/1.33 |

FOREIGN PATENT DOCUMENTS

DE 195 45 943 C1 5/1997
EP 0 074 058 3/1983

OTHER PUBLICATIONS

Patent Abstracts of Japan, vol. 1995, No. 01, Feb. 28, 1995 & JP 06 302020 A (Dainippon Ink & Chem Inc; Others: 01), Oct. 28, 1994.
Patent Abstracts of Japan, vol. 011, No. 265 (E–535) Aug. 27, 1987 & JP 62 069457 A (Nagase Screen Insatsu Kenkyusho: KK), Mar. 30, 1987.

* cited by examiner

*Primary Examiner*—John R. Lee
*Assistant Examiner*—Zia R. Hashmi
(74) *Attorney, Agent, or Firm*—Pillsbury Winthrop LLP

(57) ABSTRACT

A device for curing a UV-curable resin layer applied to a main surface or between two disc elements of a disc-shaped registration carrier, comprising rotation means for supporting the disc-shaped registration carrier and rotating it in a plane, and a rectilinear ultraviolet radiation source which is radially disposed with respect to the disc-shaped registration carrier for emitting ultraviolet radiation to the UV-curable resin layer. The length and the position of the rectilinear ultraviolet radiation source are such that the rectilinear radiation source is disposed opposite the disc-shaped registration carrier from a distance from the center of the disc-shaped registration carrier to the edge thereof. The rectilinear ultraviolet radiation source is disposed at an angle to the plane of rotation, and not parallel or perpendicularly thereto, therefore. The rectilinear ultraviolet radiation source can be disposed opposite the disc-shaped registration carrier in such a manner that it extends beyond the edge thereof, in order to expose a UV-curable resin layer applied to the edge surface of the disc-shaped registration carrier as well.

20 Claims, 3 Drawing Sheets

DEVICE FOR CURING A UV-CURABLE RESIN LAYER APPLIED TO A MAIN SURFACE OR BETWEEN TWO DISC ELEMENTS OF A DISC-SHAPED REGISTRATION CARRIER

The invention relates to a device for curing a UV-curable resin layer applied to a main surface or between two disc elements of a disc-shaped registration carrier, comprising rotation means for supporting the disc-shaped registration carrier and rotating it in a plane, and a rectilinear ultraviolet radiation source which is radially disposed with respect to the disc-shaped registration carrier for emitting ultraviolet radiation to the UV-curable resin layer, wherein the length and the position of the rectilinear ultraviolet radiation source are such that the rectilinear radiation source is disposed opposite the disc-shaped registration carrier from a distance from the centre of the disc-shaped registration carrier to the edge thereof.

A device of this kind may be considered to be known, as is indicated in passing in European patent No. 0 574 975.

In the prior art device the rectilinear ultraviolet radiation source is disposed parallel to the aforesaid plane, as a result of which the UV-curable resin layer is unevenly exposed by the ultraviolet radiation from the rectilinear ultraviolet radiation source.

The object of the present invention is to provide an even exposure of the UV-curable resin layer.

In order to accomplish that objective, the invention provides a device of the kind referred to in the introduction, which is characterized in that the rectilinear ultraviolet radiation source is disposed at an angle of between 0 and 90 degrees to the aforesaid plane.

A model has been developed on the basis of which an optimum angle can be determined, depending on the position of the rectilinear ultraviolet radiation source with respect to the aforesaid plane and the length of the rectilinear ultraviolet radiation source. This model for ultraviolet radiation energy as a function of the radius of the disc-shaped registration carrier has been verified by measurement of the unevenness in the intensity of the ultraviolet radiation over the radius of the disc-shaped registration carrier, whereby it has become apparent that this model is satisfactory in practice. It has appeared in particular that the optimum angle ranges between 20 degrees and 70 degrees, depending on the length of the rectilinear ultraviolet radiation source.

It is also possible to determine the optimum angle empirically, of course, whereby means may be provided for adjusting the said angle.

In the prior art device, additional reflectors are required for assisting in the curing of a UV-curable resin layer applied to the edge surface of the disc-shaped registration carrier. In this connection reference is also made to German patent No. 195 45 943.

Another object of the invention is to eliminate the need to use the aforesaid additional reflectors, partially because they are subject to fouling, and in order to accomplish that objective the invention provides this further aspect that the rectilinear ultraviolet radiation source is disposed opposite the disc-shaped registration carrier in such a manner that it extends beyond the edge of said disc-shaped registration carrier.

It is noted that also the device which is known from the aforesaid European patent No. 0 574 975 is capable of providing even exposure of a UV-curable resin layer applied to a main surface of a disc-shaped registration carrier whilst at the same time exposing of a UV-curable resin layer applied to the edge surface of the disc-shaped registration carrier, In this prior art device, however, a tubular ultraviolet radiation source is disposed at an angle of 90 degrees to the aforesaid plane, and a revolution body reflector is provided, on the central axis of which the tubular ultraviolet radiation source is positioned. This arrangement of the prior art device results in a low dose of ultraviolet radiation, since the larger part of the radiation is indirect radiation. In particular the portion of ultraviolet radiation that has a wavelength of less than 250 nm is too small. The reflection from the reflector is about 80% for UV-A/B and about 40% for UV-C. UV-C is important in particular for curing the UV-curable resin layer applied to the main surface of the disc-shaped registration carrier. The low dose renders it impossible to reduce the cycle time, thus necessitating the use of a tubular ultraviolet radiation source having a greater capacity, as a result of which the heat input is large.

One embodiment of the invention for increasing the light intensity is characterized in that a reflector is disposed parallel to the side of the rectilinear ultraviolet radiation source that faces away from the disc-shaped registration carrier.

In order to eliminate the phenomenon of reflector fouling, one embodiment of the invention is characterized in that the rectilinear ultraviolet radiation source is provided with a reflector on the side that faces away from the disc-shaped registration carrier. This reflector may consist of a coating which is present on part of the rectilinear ultraviolet radiation source. When this rectilinear ultraviolet radiation source is replaced, a new reflector becomes available again.

Preferably, the reflector is a cold light reflector, which transmits heat radiation.

As a result of the direct exposure in accordance with the present invention a higher ultraviolet radiation efficiency is realised, which makes it possible to use a rectilinear ultraviolet radiation source which produces deeper ultraviolet radiation, in particular up to approximately 180 nm. The present invention allows a reduction of the cycle time. Cycle times of less than two seconds are attainable.

The essence of the present invention is to provide a linear ultraviolet radiation source which is disposed at such an angle that uniform exposure will take place upon rotation of the disc-shaped registration carrier to be exposed. Since the minimum energy remains practically constant, the capacity of the rectilinear ultraviolet radiation source does not need to be higher than in the conventional case, wherein the rectilinear ultraviolet radiation source is positioned parallel to the disc-shaped registration carrier.

The UV-curable resin layer applied to a main surface of a disc-shaped registration carrier may be a protective coating, and the registration carrier of the CD-type.

The UV-curable resin layer applied between two disc elements of a disc-shaped registration carrier is a bonding, adhesive or glue layer for joining said disc elements at the time of UV-curing. The registration carrier may be of the DVD-type or SACD-type. The DVD-type registration carrier may have more than two disc elements and more than one UV-curable resin (bonding) layer (DVD 18, for instance). The UV-curable resin layer may be applied as disclosed in, for example, WO 97/36737 or DE-A1-40 41 199.

The invention will now be described in more detail with reference to the drawings, wherein.

Figures 1, 2:
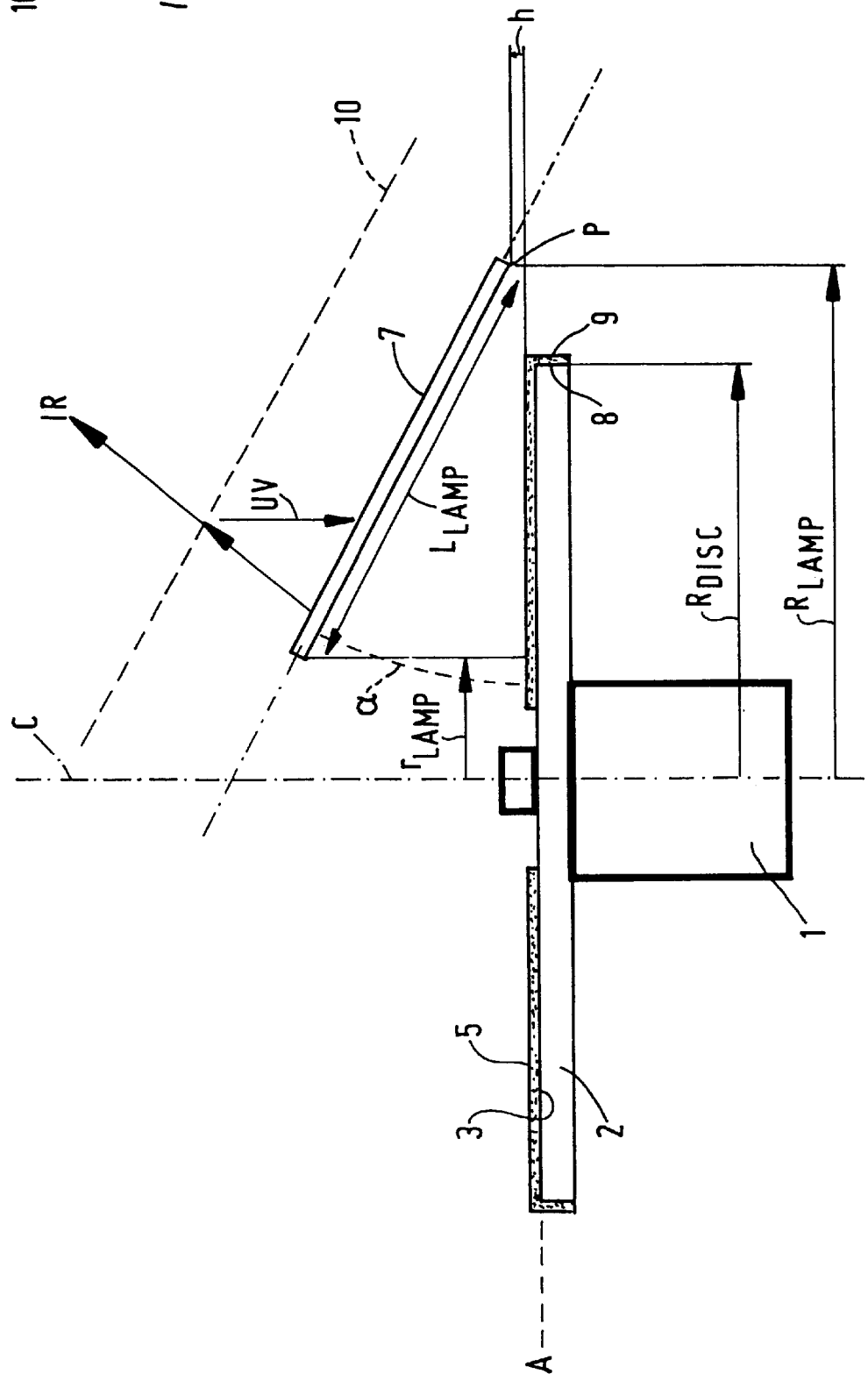
FIG. 1 is a schematic representation of an embodiment of the device according to the invention.
FIG. 2 is a sectional view of the ultraviolet radiation source and parabolic reflector of FIG. 1.

In FIG. 1, rotation means 1 support a disc-shaped registration carrier 2 for rotating the disc-shaped registration carrier 2 in a plane indicated by line A. A UV-curable resin layer 5, which is to be cured by means of ultraviolet radiation, is present on a main surface 3 of the disc-shaped registration carrier 2 (of CD-type, for instance). A rectilinear ultraviolet radiation source 7 for emitting ultraviolet radiation to UV-curable resin layer 5 is disposed radially with respect to the disc-shaped registration carrier 2. The length of the rectilinear ultraviolet radiation source 7, which is indicated at $L_{LAMP}$ in FIG. 1, and the position of the rectilinear ultraviolet radiation source 7 are such that the rectilinear ultraviolet radiation source 7 is disposed opposite the disc-shaped registration carrier 2 from a distance $r_{LAMP}$ from the centre of the disc-shaped registration carrier 2 defined by the central axis which is indicated at C in FIG. 1 to the edge of the disc-shaped registration carrier 2 which is indicated at $R_{DISC}$ in FIG. 1. The rectilinear ultraviolet radiation source 7 is disposed at an angle of between 0 and 90 degrees to plane A, which angle is indicated at α in FIG. 1.

In the embodiment which is shown in FIG. 1, the rectilinear ultraviolet radiation source 7 is disposed opposite the disc-shaped registration carrier in such a manner that it extends beyond the edge $R_{DISC}$ of the disc-shaped registration carrier 2. In FIG. 1, P indicates the so-called starting point of the rectilinear ultraviolet radiation source 7, and h indicates the so-called initial height of the rectilinear ultraviolet radiation source 7, whilst $R_{LAMP}$ indicates the distance from the starting point P of the rectilinear ultraviolet radiation source 7 to the central axis C. The initial height h of the rectilinear ultraviolet radiation source 7 is the distance from the UV-curable resin layer 5 to be cured to starting point P of the rectilinear ultraviolet radiation source 7 at $R_{LAMP}$. The initial height h may be a negative height. $r_{LAMP}$, $R_{DISC}$ and $R_{LAMP}$ will also be called the end radius, the disc radius and the starting radius, respectively, and α will be called the angle of inclination.

When the rectilinear ultraviolet radiation source 7 extends beyond the disc radius, a UV-curable resin layer indicated at 9 in FIG. 1, which is present on the edge surface of the disc-shaped registration carrier 2 indicated at 8 in FIG. 1, will be exposed by the rectilinear ultraviolet radiation source 7 at the same time as the UV-curable resin layer 5.

As is shown in FIGS. 1 and 2, a reflector 10 is disposed parallel to a side of the rectilinear ultraviolet radiation source 7 that faces away from the disc-shaped registration carrier 2, which reflector may be a parabolic reflector and which is preferably a cold light reflector. Advantageously, albeit not shown in the figures, reflector 10 is present on the rectilinear ultraviolet radiation source 7, for example in the form of a coating.

Figure 3:
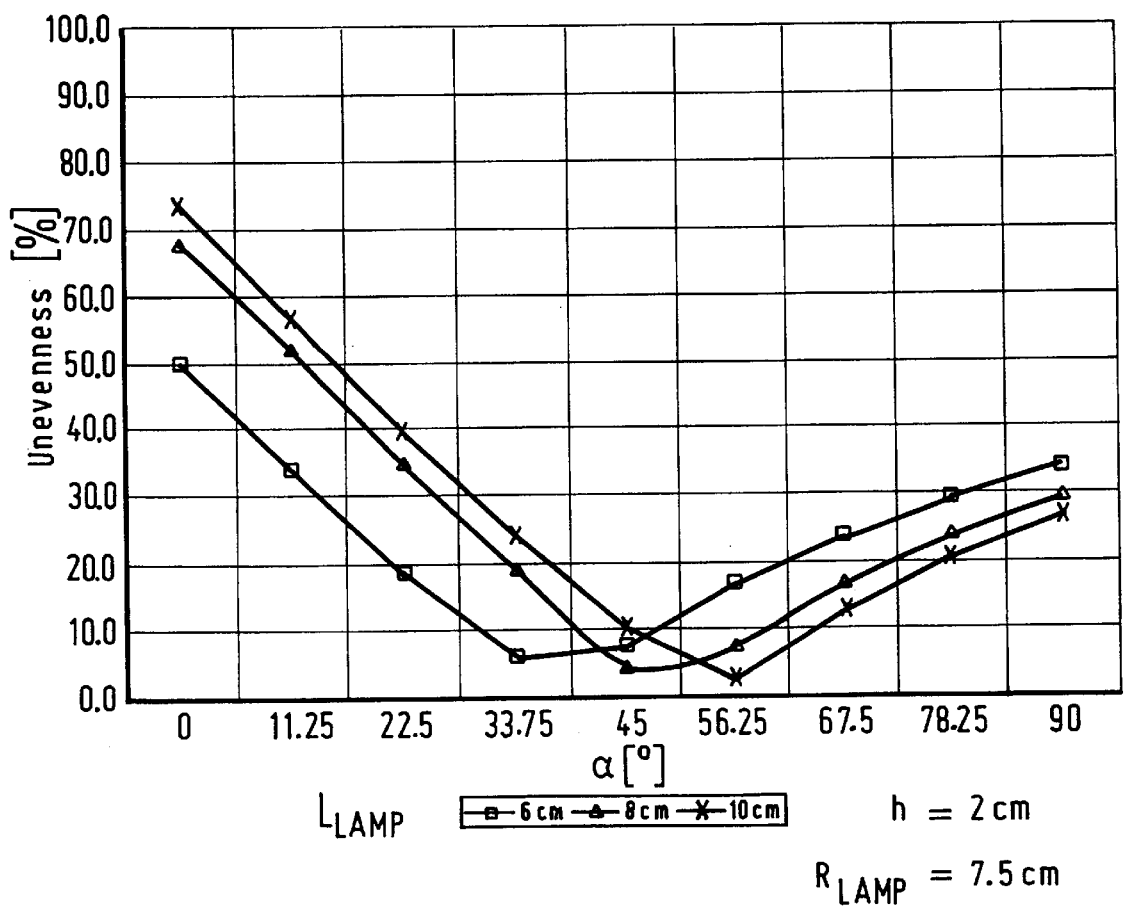
FIG. 3 is a graph which shows the unevenness in the dose as a function of the angle of inclination α with different values of the length $L_{LAMP}$ of the rectilinear ultraviolet radiation source.

A model has been drawn up for the exposure energy as a function of the radius of the disc-shaped registration carrier 2. In said model, $L_{LAMP}$, α and P ($R_{LAMP}$, h) are variables. The results expressed as unevenness (difference between maximum and minimum values) in intensity over the radius of the disc-shaped registration carrier 2, when the disc-shaped registration carrier 2 has completed one revolution, as a function of α are represented in FIG. 3 for variations in $L_{LAMP}$ in the case that $R_{LAMP}$=7.5 cm and h=2 cm.

It can be concluded from FIG. 3 that the angle of inclination α must range between 20 and 70 degrees when the required unevenness is to be below 20%.

Since the optimum angle of inclination α is a function of $L_{LAMP}$ and P, it may be advantageous for angle of inclination α to be adjustable. To that end an embodiment of the device according to the invention (not shown) comprises means for adjusting the angle of inclination α.

The rectilinear ultraviolet radiation source 7 may be a radiation source which produces deeper ultraviolet radiation, in particular ultraviolet radiation of up to approximately 180 nm.

Figure 4:
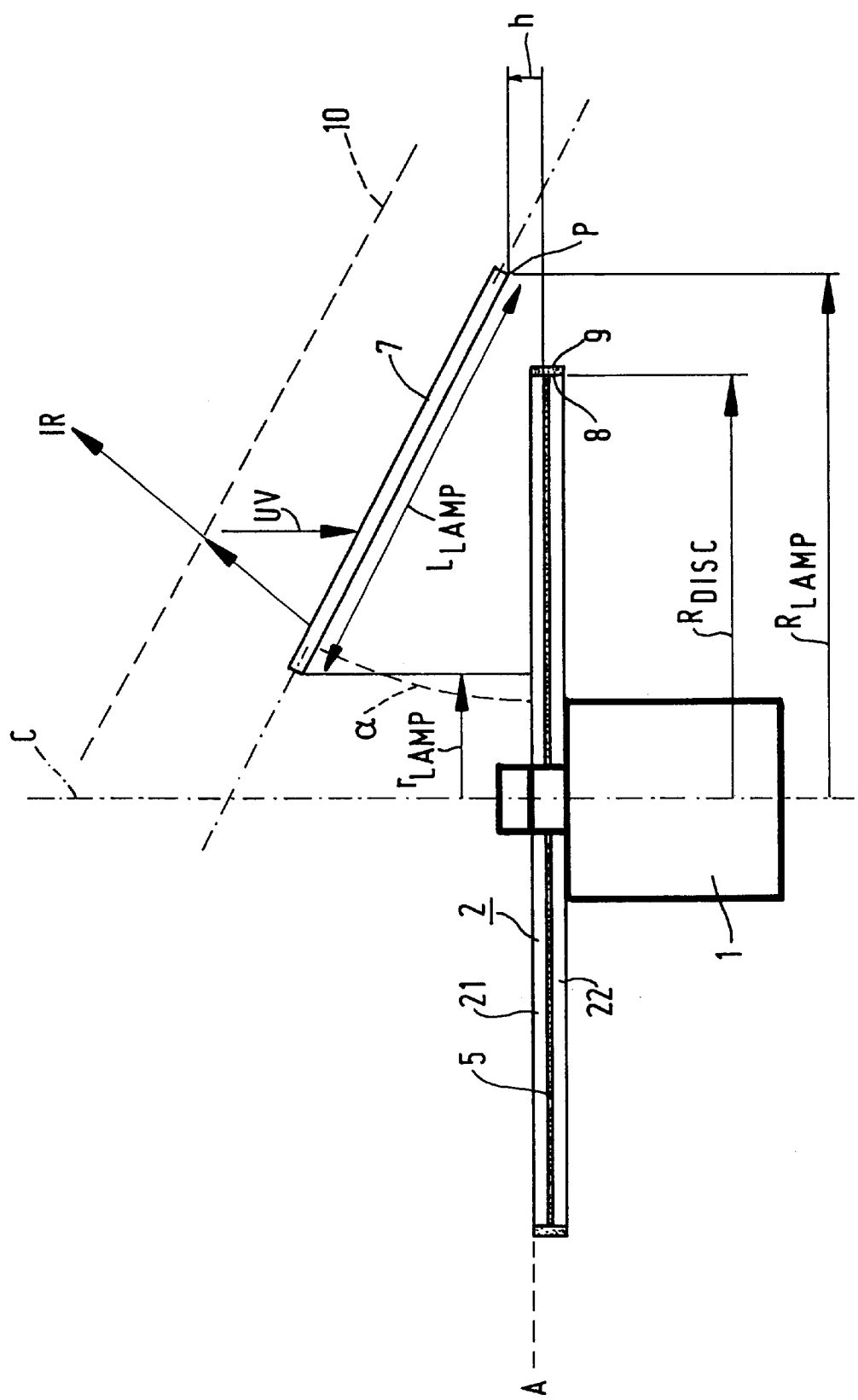
FIG. 4 is a schematic representation of another embodiment of the device according to the invention.

FIG. 4 is analogous to FIG. 1. For matter already discussed in regard of FIG. 1 the same reference symbols are used in FIG. 1. FIG. 4 differs from FIG. 1 in that a UV-curable resin layer 5 to be cured is present between two disc elements 21, 22 of a disc-shaped registration carrier 2 (of DVD-type or SACD-type, for instance). Said UV-curable resin layer 5 in this case is for joining or bonding disc elements 21, 22 to result in a unitary registration carrier 2. Radiation source 7 in operation radiates UV-radiation to the UV-curable resin layer 5 through disc element 21.

What is claimed is:

1. A device for curing a UV-curable resin layer applied to a main surface or between two disc elements of a disc-shaped registration carrier, comprising:

a rotator constructed and arranged to support the disc-shaped registration carrier and to rotate said disc-shaped registration carrier in a plane; and a rectilinear ultraviolet radiation source which is radially disposed with respect to the disc-shaped registration carrier to emit ultraviolet radiation to the UV-curable resin layer, wherein a length and a position of the rectilinear ultraviolet radiation source are such that the rectilinear ultraviolet radiation source is disposed opposite the disc-shaped registration carrier at a distance from a centre of the disc-shaped registration carrier to an edge thereof, and the rectilinear ultraviolet radiation source is disposed at an angle of between 0 and 90 degrees relative to the aforesaid plane.

2. A device according to claim 1, wherein said angle ranges between 20 and 70 degrees.

3. A device according to claim 1, further comprising an adjusting device constructed and arranged to adjust said angle.

4. A device according to claim 1, wherein the rectilinear ultraviolet radiation source is disposed opposite the disc-shaped registration carrier such that the rectilinear ultraviolet radiation source extends beyond the edge of said disc-shaped registration carrier.

5. A device according to claim 1, further comprising a reflector, said reflector being disposed parallel to a side of the rectilinear ultraviolet radiation source that faces away from the disc-shaped registration carrier.

6. A device according to claim 1, wherein the rectilinear ultraviolet radiation source is provided with a reflector on a side of said rectilinear ultraviolet radiation source that faces away from the disc-shaped registration carrier.

7. A device according to claim 5, wherein the reflector consists of a cold light reflector.

8. A device according claim 1, wherein the rectilinear ultraviolet radiation source produces deeper ultraviolet radiation.

9. A device according to claim 8, wherein the rectilinear ultraviolet source produces deeper ultraviolet radiation of up to approximately 180 nm.

10. A device for curing a UV-curable resin layer applied to a main surface or between two disc elements of a disc-shaped registration carrier, comprising:
- a rotator constructed and arranged to support the disc-shaped registration carrier and to rotate said disc-shaped registration carrier in a plane; and
- a rectilinear ultraviolet radiation source which is radially disposed with respect to the disc-shaped registration carrier to emit ultraviolet radiation to the UV-curable resin layer,
- wherein a length and a position of the rectilinear ultraviolet radiation source are such that the rectilinear ultraviolet radiation source is disposed opposite the disc-shaped registration carrier at a distance from a centre of the disc-shaped registration carrier to an edge thereof, and the rectilinear ultraviolet radiation source is disposed at an angle of between 0 and 90 degrees relative to the aforesaid plane so that a radially inner end of the rectilinear radiation source is at a greater distance than a radially outer end of the rectilinear source relative to said plane.

11. A device for curing a UV-curable resin layer applied to a main surface or between two disc elements of a disc-shaped registration carrier, comprising:
- a rotator constructed and arranged to support the disc-shaped registration carrier and to rotate said disc-shaped registration carrier in a plane; and
- a rectilinear ultraviolet radiation source which is radially disposed with respect to the disc-shaped registration carrier to emit ultraviolet radiation to the UV-curable resin layer,
- wherein a length and a position of the rectilinear ultraviolet radiation source are such that the rectilinear ultraviolet radiation source is disposed opposite the disc-shaped registration carrier at a distance from a centre of the disc-shaped registration carrier to an edge thereof, and the rectilinear ultraviolet radiation source is disposed at an angle of between 0 and 90 degrees relative to the aforesaid plane such that the UV-curable resin layer cures substantially homogeneously over substantially an entire surface of the disc-shaped registration carrier.

12. A device according to claim 2, further comprising an adjusting device constructed and arranged to adjust said angle.

13. A device according to claim 3, wherein the rectilinear ultraviolet radiation source is disposed opposite the disc-shaped registration carrier such that the rectilinear ultraviolet radiation source extends beyond the edge of said disc-shaped registration carrier.

14. A device according to claim 3, further comprising a reflector, said reflector being disposed parallel to a side of the rectilinear ultraviolet radiation source that faces away from the disc-shaped registration carrier.

15. A device according to claim 4, wherein the rectilinear ultraviolet radiation source is provided with a reflector on a side of said rectilinear ultraviolet radiation source that faces away from the disc-shaped registration carrier.

16. A device according to claim 6, wherein the reflector consists of a cold light reflector.

17. A device according claim 3, wherein the rectilinear ultraviolet radiation source produces deeper ultraviolet radiation.

18. A device according claim 4, wherein the rectilinear ultraviolet radiation source produces deeper ultraviolet radiation.

19. A device according claim 5, wherein the rectilinear ultraviolet radiation source produces deeper ultraviolet radiation.

20. A device according claim 6, wherein the rectilinear ultraviolet radiation source produces deeper ultraviolet radiation.

* * * * *